UNITED STATES PATENT OFFICE.

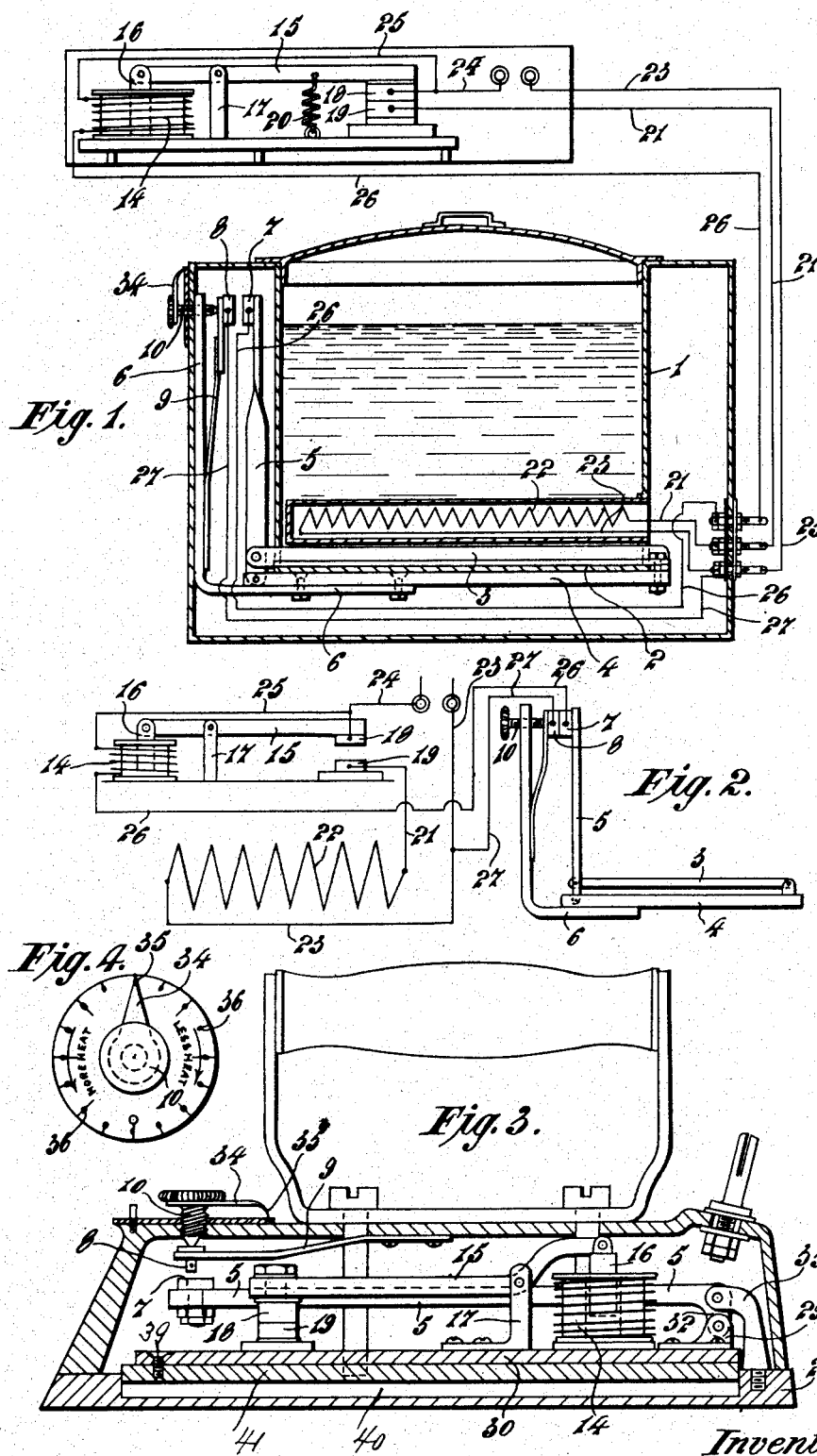

JAMES CHARLES PARKE KIRKWOOD, OF WELLINGTON, NEW ZEALAND, ASSIGNOR TO HERBERT DOUGLAS VICKERY, OF WELLINGTON, NEW ZEALAND.

MEANS FOR REGULATING THE TEMPERATURE OF ELECTRICAL HEATING AND COOKING APPARATUS.

1,025,576.   Specification of Letters Patent.   Patented May 7, 1912.

Application filed March 8, 1912. Serial No. 682,425.

*To all whom it may concern:*

Be it known that I, JAMES CHARLES PARKE KIRKWOOD, subject of the King of Great Britain and Ireland, residing at 88 Willis street, in the city of Wellington, in the Dominion of New Zealand, electrical engineer, have invented a new and useful Improvement in Means for Regulating the Temperature of Electrical Heating and Cooking Apparatus; and I do hereby declare the following to be a full, clear, and exact description of the same.

This invention provides for the automatic regulation of the temperature of electric heating and cooking apparatus such as electric stoves and ovens, electric irons, urns, and all such like apparatus where the heating medium is electricity.

The desired regulation is obtained by means whereby the heating circuit is automatically cut out, when a particular part of the apparatus reaches a desired temperature and when the temperature of the said particular part decreases sufficiently, the circuit will be automatically renewed. The means provided allow of the degree of heat at or near which the apparatus is desired to be retained, to be simply and easily regulated or changed by an operator.

The expansive and contractive properties due to heating and cooling of suitable metals or materials are utilized to effect the automatic breaking and making of an electrical circuit which contains the heating element. The expanding or contracting metal being either a part of the heating apparatus or a special part attached thereto, the expansion and contraction of said metal is caused by the increase and decrease of the temperature of the apparatus itself.

Reference is to be had to the accompanying drawings forming a part of this specification, in which similar characters of reference indicate corresponding parts in all the figures.

Figure 1, is a sectional elevation of an electric water heater in which my invention is embodied. Fig. 2, is a diagrammatic view showing the electrical circuits. Fig. 3, is a sectional elevation of the invention applied to a laundry iron. Fig 4, is a plan view of a regulating indicator.

Referring to Figs. 1 and 2 the numeral 1 indicates the vessel of an electrical water heater of any usual construction, and 3 indicates a reinforcing metal member fixed to the bottom 2 of said vessel so as to expand with it. A slab 4 of marble or the like non-metallic substance having a low co-efficient of expansion is arranged on the bottom 2 and is fixed to the member 3 at one end thereof. On the other end of the member 3, which end projects through the wall of the vessel 1, is pivoted a lever 5, the end thereof being pivoted in the end of the marble slab 4 as shown. The long arm of the lever 5 is provided with a contact piece 7 insulated from the lever and adapted to make contact with another contact piece 8 fixed to, but insulated from a spring arm 9. A screw 10 passing through the upper end of the bracket 6 is used to adjust the relation of the contact 8 to the contact 7. A solenoid 14 is located in a suitable position; the drawing shows it mounted upon the distribution board of electric supply. The solenoid has a lever 15 pivoted at one end to its core 16. The lever 15 is pivoted in a stud 17 and its long arm is provided with a contact piece 18 fixed to but insulated from the lever 15. A contact piece 19 is provided below the contact piece 18 the two contact pieces being normally held together by means of a spring 20 attached to the lever 15. A wire 21 (see particularly Fig. 2) leads from the contact piece 19 to the heating element or resistance 22, to the other end of which one of the leading wires 23 is connected, the other leading wire 24 being connected to the contact piece 18 so that when the contact pieces are normally held together by the spring 20 as shown in Fig. 1 current flows through the resistance 22 and heats the contents of the vessel.

The means by which the current is automatically cut out when the apparatus reaches a desired heat will now be described: A wire 25 leads from the leading wire 24 to one end of the solenoid 14 while a wire 26 leads from the other end of said solenoid to the contact piece 7 on the lever 5. Another wire 27 leads from the leading wire 23 to the contact piece 8 on the front end of the arm 9. It will be seen that while the contact pieces 18 and 19 are together current will continue to flow through the resistance 22 but when the vessel becomes sufficiently heated to expand the bottom 2 and member 3 and thereby operate the lever 5 to bring the contacts 7 and 8 together, part of the current will be shunted through the solenoid 14 which immediately becoming an electro-magnet will pull the core 16 downward and so break the contact of the contact pieces 18 and 19 thereby cutting off the whole of the current from the resistance 22. Thus the solenoid and its accompanying parts form an electromagnetic switch. Immediately the vessel cools sufficiently to allow the bottom 2 and member 3 to contract and to part the contact pieces 7 and 8, the solenoid will cease to be an electro-magnet thereby allowing the lever 15 to be returned to its normal position by means of the spring 20, and bring the contact pieces 18 and 19 together thus closing the circuit through the heating resistance.

Fig. 3 represents the device as applied to an electric flat iron, and in order that the construction may be easily followed the same reference numerals are used to indicate the same parts. In this case the bottom 28 of the iron is used as the expansion medium in a similar manner to the bottom 2 of the water heater. The lever 5 is pivoted in a bracket 29 mounted on an asbestos slate plate 30 or other similar non-metallic substance of which the co-efficient of expansion is low, the front end of said plate being fixed by a screw 39 or other suitable means near the point of the iron to a metal plate 41 disposed directly above the resistance element. The rear end 32 of the lever 5 is pivoted in a bracket 33 fixed to the rear end of the bottom 28, which when it expands will cause the contact pieces 7 and 8 to be brought together and the current cut off from the resistance element in the same manner as described in reference to the apparatus shown in Fig. 1. The solenoid 14, stud 17 and contact piece 19 are all mounted on the asbestos slate plate 30 in place of being mounted upon the distribution board as in that of Fig. 1, while the space 40 between plate 41 and bottom 28 is designed to receive the resistance element.

The point of temperature at which the current is cut off is determined by the distance of the contact pieces 7 and 8 and such distance may be adjusted by means of the adjusting screw 10. To furnish an indication to the operator of the temperature to which the apparatus is to be set, the adjusting screw 10 is provided with a pointer 34 (see Fig. 4) the point 35 being adapted to snip into recesses 36 on an indicator or dial 37 which may be marked off to show at what temperature the current will be cut off.

It is to be observed that in both constructions shown, it is one of the normal walls of the container, (which term is applicable generically to both the vessel 1 and the iron), which contracts and expands through the action of the resistance element and, by means of its connections with the solenoid, serves to operate the latter. In the first construction the part 3 is directly connected to lever 5 and actuates the same, but since this part is connected to the bottom 2, it is the expansion and contraction of the latter which may be considered as effecting the thermostatic action of the aforesaid part 3. In the iron construction, also, it is the bottom 28 which is directly affected by the resistance element and acts as a thermostat to control the solenoid. As further regards the iron construction, it is to be noted that all working parts of the apparatus are contained therewithin, which is a matter of great convenience, as will be understood, and that the inclusion of a solenoid in the apparatus is also a matter of great advantage since it provides for a gradual make and break of the main circuit and thus prevents sparking and consequent rapid, burning out of the iron. Finally it is to be noted that the indicator is located upon the body of the flat iron, so that the temperature at which the main circuit is to be closed and the current to be cut off can be readily determined, and the said indicator can be readily manipulated to control the temperature when desired.

What I claim as my invention and desire to secure by Letters Patent of the United States, is:—

1. The combination, with a container having one of its normal walls free to expand and contract, of a resistance element disposed within said container adjacent said wall for heating the same, a main circuit wherein said element is included, a shunt circuit having an electro-magnetic switch included therein, and electrically-operated connections for automatically operating the switch consequent upon the expansion and contraction of said wall, to alternately make one of said circuits and break the other.

2. The combination, with a container having one of its normal walls free to expand and contract, of a resistance element disposed within said container adjacent said wall for heating the same, a main circuit wherein said element is included, a shunt circuit having a solenoid included therein, and electrically-operated connections for automatically operating the solenoid consequent upon the expansion and contraction of said wall, to alternately make one of said circuits and break the other.

3. The combination, with a hollow flat iron having its bottom wall free to expand and contract, of a resistance element and an electro-magnetic switch disposed within the interior of said flat iron, said element being located adjacent said wall to heat the same, a main circuit wherein said element is included, a shunt circuit wherein said switch is included, and electrically operated connections for automatically operating the switch consequent upon the expansion and contraction of said wall, to alternately make one of said circuits and break the other.

4. The combination, with a hollow flat iron having its bottom wall free to expand and contract, of a resistance element and a solenoid disposed within the interior of said flat iron, said element being located adjacent said wall to heat the same, a main circuit wherein said element is included, a shunt circuit wherein said solenoid is included, and electrically operated connections for automatically operating the solenoid consequent upon the expansion and contraction of said wall to alternately make one of said circuits and break the other.

5. The combination, with a hollow flat iron, of a resistance heating element and a solenoid disposed within the interior of said flat iron, a main circuit wherein said element is included, a shunt circuit wherein said solenoid is included, and electrically-operated means for automatically operating the solenoid to make the shunt circuit and break the main circuit when the temperature of the heated flat iron rises above a predetermined point, and to break the shunt circuit and make the main circuit when the temperature subsequently falls below such point.

6. The combination, with a container having one of its normal walls free to expand and contract, of a resistance element disposed within said container adjacent said wall for heating the same, a main circuit wherein said element is included, a shunt circuit having an electro-magnetic switch included therein, electrically-operated connections for automatically operating the switch consequent upon the expansion and contraction of said wall, to alternately make one of said circuits and break the other, and a controller associated with said electrical connections for regulating the degree of heat at which the main circuit is made and broken.

7. The combination, with a hollow flat iron having its bottom wall free to expand and contract, of a resistance element and an electro-magnetic switch disposed within the interior of said flat iron, said element being located adjacent said wall to heat the same, a main circuit wherein said element is included, a shunt circuit wherein said switch is included, electrically operated connections for automatically operating the switch consequent upon the expansion and contraction of said wall, to alternately make one of said circuits and break the other, and a controller secured to one of the other walls of said flat iron and associated with said electrical connections for regulating the degree of heat at which main circuit is made and broken.

In testimony whereof, I have signed my name to this specification in the presence of two subscribing witnesses.

JAMES CHARLES PARKE KIRKWOOD.

Witnesses:
SYDNEY HAMLET HIGGS,
EDMOND PATRICK O'DONNELL.